United States Patent
Kimura

[11] Patent Number: 6,073,061
[45] Date of Patent: Jun. 6, 2000

[54] BICYCLE OPERATING METHOD USING PREDICTED VALUES

[75] Inventor: Yoshiki Kimura, Shimonoseki, Japan

[73] Assignee: Shimano, Inc., Osaka, Japan

[21] Appl. No.: 08/993,683

[22] Filed: Dec. 18, 1997

[30] Foreign Application Priority Data

Dec. 20, 1996 [JP] Japan ................................ 8-354955

[51] Int. Cl.$^7$ ................................................. B62M 25/08
[52] U.S. Cl. ................................................ 701/1; 280/260
[58] Field of Search ........................... 701/1, 51; 702/145, 702/149, 147, 148; 324/178, 179, 180; 280/238, 260; 474/103

[56] References Cited

U.S. PATENT DOCUMENTS

| | | | |
|---|---|---|---|
| 4,071,892 | 1/1978 | Genzling | 364/424 |
| 4,490,127 | 12/1984 | Matsumoto et al. | 474/110 |
| 4,633,216 | 12/1986 | Tsuyama | 340/134 |
| 4,636,769 | 1/1987 | Tsuyama | 340/134 |
| 4,642,606 | 2/1987 | Tsuyama | 340/134 |
| 5,213,548 | 5/1993 | Colbert et al. | 474/71 |
| 5,261,858 | 11/1993 | Browning | 474/69 |
| 5,551,315 | 9/1996 | Pikoulas | 74/502.2 |
| 5,569,104 | 10/1996 | Bellio et al. | 474/70 |
| 5,644,511 | 7/1997 | McWhorter | 702/148 |

FOREIGN PATENT DOCUMENTS

| | | |
|---|---|---|
| 8-113181 | 5/1996 | Japan. |
| 8-113182 | 5/1996 | Japan. |
| WO 91/17078 | 11/1991 | WIPO. |
| WO 95/26900 | 10/1995 | WIPO. |

*Primary Examiner*—Michael J. Zanelli
*Attorney, Agent, or Firm*—James A. Deland

[57] ABSTRACT

A method of shifting a bicycle transmission includes the step of calculating, by a computer, a past period of a wheel revolution. The computer may then calculate a current virtual period of the wheel revolution from the past period. The bicycle transmission is then shifted at a time calculated by the computer within the virtual period. In another embodiment of the present invention, a virtual velocity may be calculated from the past period, and the bicycle transmission may be shifted at the virtual velocity. If desired, the computer may calculate a past velocity from the past period, and the virtual velocity may be calculated from the past velocity. To alleviate stress on the transmission, the bicycle transmission may be shifted when the virtual velocity is less than the past velocity (i.e., during deceleration). Also, the virtual velocity may be set for a smooth transmission from one gear to another.

31 Claims, 3 Drawing Sheets

BICYCLE OPERATING METHOD USING PREDICTED VALUES

BACKGROUND OF THE INVENTION

The present invention is directed to a method of shifting a bicycle transmission and, more particularly, to a method of shifting a bicycle transmission using predicted (virtual) values.

As with automobiles, automatic shifting is also desired in bicycles. Automatic shifts are controlled by a computer on the basis of electrical signals representative of such values as chassis acceleration, velocity, crank spindle torque, and so on. The sensing of velocity is known from numerous publications. For example, in U.S. Pat. No. 4,071,892 the velocity is calculated by sensing the period of the wheel revolution with a moving-side sensor which is attached to the wheel spokes and a stationary-side sensor that is fixed on the bicycle chassis. Performing automatic shifting on the basis of the velocity thus sensed is also known from numerous publications, such as U.S. Pat. No. 4,071,892 and Japanese Laid-Open Patent Application 8-113182. A shift that is performed electrically does not have to be an automatic shift, and may also be performed as desired by the rider.

However, even when shifting is performed as desired by the rider, it is usually desirable to shift the transmission when there will be a smooth transition from one gear to another and/or to perform the actual shift during deceleration, when the drive system of the shift mechanism is easier to operate. No such shift capability is known, however. If such a method is to be implemented, then from the standpoints of cost, maintenance inspection, light weight, and so on, as few sensors as possible should be used.

SUMMARY OF THE INVENTION

The present invention is directed to a method of shifting a bicycle transmission wherein shifting is performed quickly at an optimum time. The optimum time may be when there will be a smooth transition from one gear to another and/or during deceleration, when the drive system of the shift mechanism is easier to operate.

In one embodiment of the present invention, a method of shifting a bicycle transmission includes the step of calculating, by a computer, a past period of a wheel revolution. The computer may then calculate a current virtual period of the wheel revolution from the past period. The bicycle transmission is then shifted at a time calculated by the computer within the virtual period. In another embodiment of the present invention, a virtual velocity may be calculated from the past period, and the bicycle transmission may be shifted at the virtual velocity. If desired, the computer may calculate a past velocity from the past period, and the virtual velocity may be calculated from the past velocity. To alleviate stress on the transmission, the bicycle transmission may be shifted when the virtual velocity is less than the past velocity (i.e., during deceleration). Also, the virtual velocity may be set for a smooth transmission from one gear to another.

The bicycle transmission may be shifted automatically by a shifting device that operates under control of the computer, or shifting may be manually accomplished by the rider. During manual shifting, the computer may still control shifting by ensuring that shifting only takes place at the optimum time or velocity. In any event, shifting may be performed quickly, with precision, at the optimum time, and using a minimum number of sensors.

DETAILED DESCRIPTION OF THE EMBODIMENTS

Figure 1:
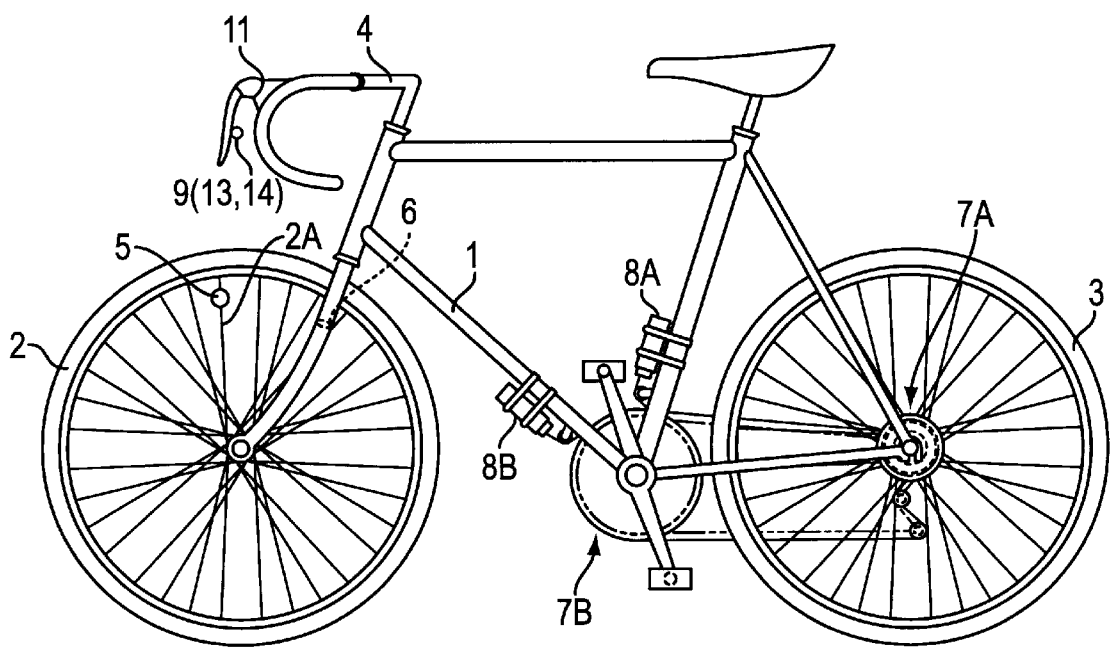
FIG. 1 is a side view of a particular embodiment of a bicycle used to perform the method of shifting a bicycle transmission according to the present invention.

FIG. 1 is a side view of a particular embodiment of a bicycle used to perform the method of shifting a bicycle transmission according to the present invention. The bicycle comprises a chassis frame 1, a front wheel 2, a rear wheel 3, a handle frame 4, and so on. A moving-side sensor 5 is attached to the spokes 2A of the front wheel 2 or the rear wheel 3, and a stationary-side sensor 6 is fixed to the chassis frame 1. The moving-side sensor 5 is formed from an iron core, a magnet, or the like. When the moving-side sensor 5 passes near the stationary-side sensor 6 during each revolution of the wheel, the stationary-side sensor 6 outputs an electrical pulse.

An externally mounted shifting mechanism is provided to the chassis frame 1. The shifting mechanism comprises a rear wheel axle-side shifting mechanism 7A and a crank spindle-side shifting mechanism 7B. The shifting mechanism is any commonly known mechanism, including a derailleur. A shift drive mechanism 8A that drives the rear wheel axle-side shifting mechanism 7A, and a shift drive mechanism 8B that drives the crank spindle-side shifting mechanism 7B are attached to the chassis frame 1. The shift drive mechanism 8A and shift drive mechanism 8B are each equipped with a reciprocator that includes a servo mechanism and moves back and forth in a straight line. The reciprocal drive source may be an electric motor or an air cylinder.

A shift command switch 9 is provided to a suitable location on the handle frame 4. An example of a suitable location on the handle frame 4 is the brake lever 11. The shift command switch 9 comprises at least an upshift switch 13 that indicates a higher gear, and a downshift switch 14 that indicates a lower gear. This switch can be, for example, a see-saw switch that returns to a central position in its natural state, and whose side portions move in opposite directions, with movement to one side outputting an upshift signal, and movement in the other direction outputting a downshift signal.

Figure 2:
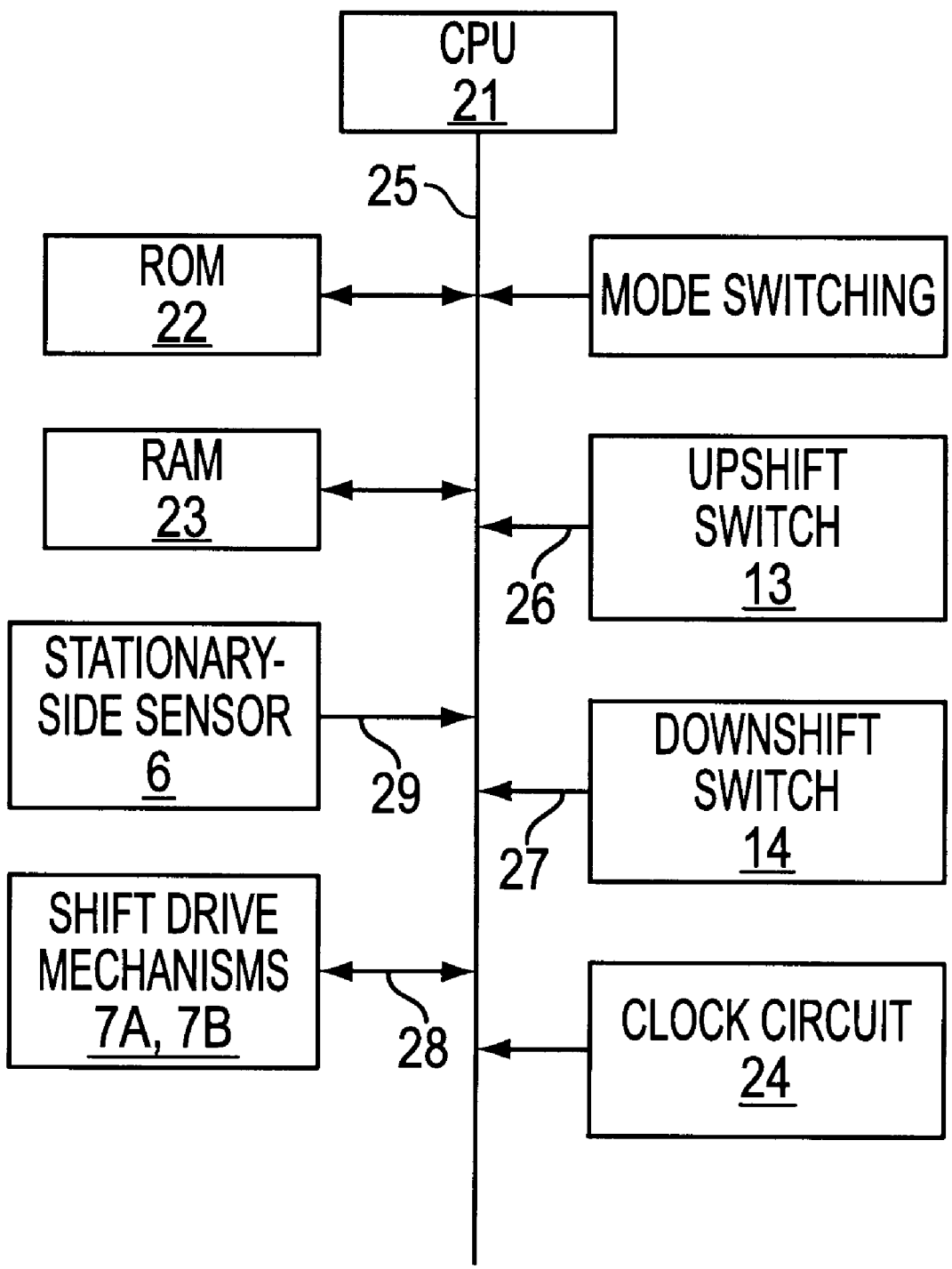
FIG. 2 is a schematic diagram of the components used to perform the method of shifting the bicycle transmission according to the present invention.

FIG. 2 is a schematic diagram of the electrical circuit used to control the shift drive mechanism 8A and shift drive mechanism 8B. The electrical circuit comprises a microcomputer. This microcomputer includes a CPU 21, a ROM 22, a RAM 23, a clock circuit 24, and a signal communicating circuit 25. An upshift signal 26 outputted by the upshift switch 13 and a downshift signal 27 outputted by the downshift switch 14 are inputted to the CPU 21 via the signal communicating circuit 25. A drive signal 28 that includes a servo signal is transmitted between the CPU 21 and the shifting drive mechanisms 7A and 7B. A period signal pulse 29 that is outputted from the stationary-side sensor 6 is inputted to the CPU 21.

Figure 3:
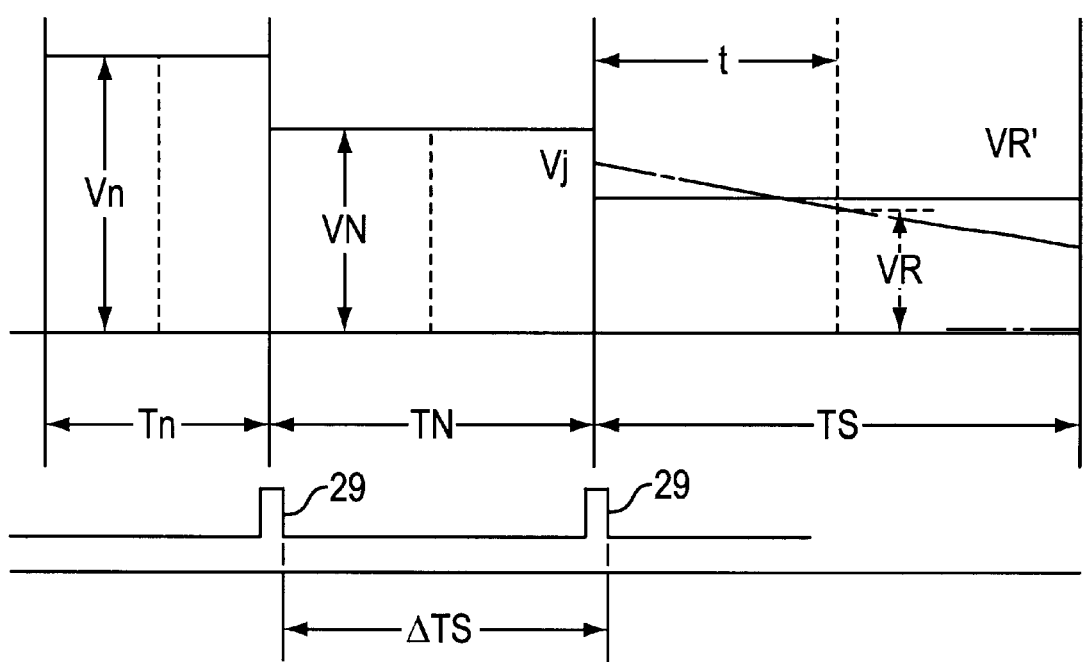
FIG. 3 is a graph of velocity and period functions including a virtual period and a virtual velocity according to the present invention.

Programming of the microcomputer may be understood by referring to FIG. 3. In general, a velocity $V_n$ calculated after the $n^{th}$ signal pulse 29 is output (where n is an integer greater than zero) may be calculated by the following equation:

$$V_n = S/T_n \quad (1)$$

In this equation, $T_n$ is the elapsed time (period) between successive signal pulses 29, i.e., pulse n and pulse (n−1), and S is the circumference of the wheel determined by multiplying the effective outside diameter of the tire by π. In other words, the velocity $V_n$ is the mean velocity of the nth period.

As shown in FIG. 3, the mean velocity of the most recently completed period $T_N$ is expressed by $V_N$, where N=n+1. The current period that has yet to be completed in the future, termed the virtual period, is expressed by $T_S$, where S=N+1=n+2. An arbitrary time within this period is expressed by t. Specifically, the time t is the time elapsed from the pulse signal 29 at which the last period $T_N$ was completed. The virtual velocity at the time t is expressed by $V_R$. R is greater than N, but is less than N+1, and is not an integer. In this embodiment, the shift control in the present invention only occurs during deceleration, when the bicycle is not going uphill and no torque is acting on the crank. Therefore, the virtual velocity $V_R$ is less than the mean velocity $V_N$ of period $T_N$. If desired, the virtual velocity $V_R$ may be generally expressed by the following equation:

$$V_R = -kt + V_j \quad (2)$$

In this equation, k is a deceleration constant indicating the slope (rate) of deceleration. This deceleration constant may be derived from the coefficients of friction of the various components of the bicycle, the coefficients of friction of the tires and the road, and so on, but in short, it is a constant obtained by measurement of an actual road, and it is preset in the ROM 22. $V_j$ is a velocity constant. The velocity constant $V_j$ is preset in a 1-to-1 relationship to each period $T_n$. This constant is determined for each model by actual testing of the bicycle, and it is preset in the ROM 22. Depending on the value of the time t, the virtual velocity may be negative. If a time twice the value of $T_N$ passes without a pulse signal 29 being generated, then it is assumed that the bicycle stopped, and zero is substituted for the virtual velocity VR.

If desired, equation (2) can be expressed as a function of the previous velocity $V_N$ as follows:

$$V_R = K \cdot (S/T_N)$$
$$= K_N \cdot V_N \quad (3)$$

In this equation, $K_N$ is a dimensionless constant. The deceleration constant $K_N$ may be a function of the period $T_N$, and it can be preset according to the value of the period and stored in ROM 22. The deceleration constant can also be expressed as a function of $(1/T_N)$ in which the inverse of the period $T_N$ is used as a variable.

If desired, a virtual velocity VR' can be expressed by the following equation.

$$VR' = V_N - K_{N,n} \cdot (V_n - V_N)$$
$$= V_N - K_{N,n} \cdot S(1/T_n - 1/T_N) \quad (4)$$

$K_{N,n}$ is a second deceleration constant. The deceleration constant $K_{N,n}$ is a function of the period $T_N$ and the period $T_n$, but can be preset according to the pairing of the values for the period $T_N$ and the period $T_n$. The deceleration constant $K_{N,n}$ thus given is inputted ahead of time to the ROM 22. Formula (4) allows the precision of the virtual velocity to be raised with respect to Formula (3). A more generalized way of viewing formula (4) is:

$$VR = V(Tj, \ldots Tn, TN) \quad (5)$$

In this case, the integer j is any integer less than n or N and greater than zero. Thus, the virtual velocity may be calculated by any series of past period data, usually a series of continuous past periods, although continuity of the series of past periods is not necessary. In this embodiment, each period $\Delta T_S$ is represented by the number of pulses emitted by clock circuit 24 between adjacent pulses 29.

Mode switching among the plurality of shifting modes is performed with a switch (not shown). In this embodiment, there are two modes: the automatic gear selection mode pertaining to the present invention, in which the gear is selected automatically, and a manual gear selection mode, in which the gear is selected manually with an electric switch. In the automatic gear selection mode, either the upshift switch 13 or the downshift switch 14 is pressed with a finger. Since the last pulse 29 has been outputted, the virtual velocity VR at any time t is calculated by Formulas 2, 3, or 4, which are specific forms of Formula 5.

The relation between velocity and the gear may be preset, and mapped control may be performed. In this case the velocities on the map are set in a stepped velocity range according to the shift gears, and the range is determined by the upper limit velocity and lower limit velocity. The gear corresponding to the stepped velocity range in which the virtual velocity is included is decided by the CPU 21. Pulses indicating the difference between the actual gear number and the decided gear number are outputted as the drive signal 28 from the CPU 21. Upon receiving the drive signal 28, the shifting mechanism 7 is actuated and the gear is changed.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. Shifting can be automated, without relying on the output signals of the upshift switch 13 or the downshift switch 14. In the case of automation, the above-mentioned calculations will be carried out constantly immediately after the pulses 29 are output, and shifting can be performed in a steady-state fashion. In this case, a steady-state shifting mode is added.

Thus, the scope of the invention should not be limited by the specific structures disclosed. Instead, the true scope of the invention should be determined by the following claims.

What is claimed is:

1. A method of operating a bicycle computer comprising the steps of:
   calculating, by the computer, a current virtual period of a wheel revolution from a past period; and
   generating an indicating signal during the current virtual period.

2. A method of shifting a bicycle transmission comprising the steps of:
   calculating, by a computer, a current virtual period of a wheel revolution from a past period; and
   shifting the bicycle transmission based on the current virtual period of the wheel revolution.

3. A method of shifting a bicycle transmission comprising the steps of:
   calculating, by a computer, a past period of a wheel revolution;

calculating, by the computer, a current virtual period of the wheel revolution from the past period; and shifting the bicycle transmission at a time calculated by the computer within the virtual period.

4. The method according to claim 3 further comprising the steps of:

sensing each wheel revolution from a moving-side sensor attached to a wheel and a fixed-side sensor attached to the bicycle chassis; and communicating the sensed wheel revolution to the computer.

5. The method according to claim 3 wherein the shifting step comprises the steps of:

generating a shift command signal from a manually operated shift command device; and shifting the bicycle transmission only if the shift command signal has been generated.

6. The method according to claim 5 further comprising the steps of:

sensing each wheel revolution from a moving-side sensor attached to a wheel and a fixed-side sensor attached to the bicycle chassis; and communicating the sensed wheel revolution to the computer.

7. A method of operating a bicycle computer comprising the steps of:

calculating, by the computer, a virtual velocity expected to occur during a current wheel revolution from a past period of the wheel revolution; and generating an indicating signal at the virtual velocity.

8. A method of shifting a bicycle transmission comprising the steps of:

calculating, by a computer, a virtual velocity expected to occur during a current wheel revolution from a past period of the wheel revolution; and shifting the bicycle transmission based on the virtual velocity of the wheel revolution.

9. A method of shifting a bicycle transmission comprising the steps of:

calculating, by a computer, a past period of a wheel revolution;

calculating, by the computer, a virtual velocity expected to occur during a current wheel revolution from the past period; and shifting a bicycle transmission at the virtual velocity calculated by the computer.

10. The method according to claim 9 wherein the past period calculating step comprises the step of calculating a plurality of past periods of the wheel revolution, and wherein the virtual velocity calculating step comprises the step of calculating the virtual velocity from the plurality of past periods.

11. The method according to claim 10 wherein the past period calculating step comprises the step of calculating a plurality of continuous past periods of the wheel revolution, and wherein the virtual velocity calculating step comprises the step of calculating the virtual velocity from the plurality of continuous past periods.

12. The method according to claim 9 further comprising the step of calculating a past velocity from the past period, and wherein the shifting step comprises the step of shifting the bicycle transmission only when the virtual velocity is less than the past velocity.

13. The method according to claim 9 further comprising the steps of:

sensing each wheel revolution from a moving-side sensor attached to a wheel and a fixed-side sensor attached to the bicycle chassis; and communicating the sensed wheel revolution to the computer.

14. The method according to claim 9 wherein the shifting step comprises the steps of:

generating a shift command signal from a manually operated shift command device; and shifting the bicycle transmission only if the shift command signal has been generated.

15. The method according to claim 14 further comprising the steps of:

sensing each wheel revolution from a moving-side sensor attached to a wheel and a fixed-side sensor attached to the bicycle chassis; and communicating the sensed wheel revolution to the computer.

16. A method of operating a bicycle computer comprising the steps of:

calculating, by the computer, a virtual velocity expected to occur during a current wheel revolution from a past velocity of the wheel revolution; and generating an indicating signal at the virtual velocity.

17. A method of shifting a bicycle transmission comprising the steps of:

calculating, by a computer, a virtual velocity expected to occur during a current wheel revolution from a past velocity of the wheel revolution; and shifting the bicycle transmission based on the virtual velocity of the wheel revolution.

18. A method of shifting a bicycle transmission comprising the steps of:

calculating, by a computer, a past velocity of a wheel revolution;

calculating, by the computer, a virtual velocity expected to occur during a current wheel revolution from the past velocity; and shifting a bicycle transmission at the virtual velocity calculated by the computer.

19. The method according to claim 18 wherein the shifting step comprises the step of shifting the bicycle transmission only when the virtual velocity is less than the past velocity.

20. The method according to claim 18 further comprising the steps of:

sensing each wheel revolution from a moving-side sensor attached to a wheel and a fixed-side sensor attached to the bicycle chassis; and communicating the sensed wheel revolution to the computer.

21. The method according to claim 18 wherein the shifting step comprises the steps of:

generating a shift command signal from a manually operated shift command device; and shifting the bicycle transmission only if the shift command signal has been generated.

22. The method according to claim 21 further comprising the steps of:

sensing each wheel revolution from a moving-side sensor attached to a wheel and a fixed-side sensor attached to the bicycle chassis; and communicating the sensed wheel revolution to the computer.

23. A method of shifting a bicycle transmission comprising the steps of:

calculating, by a computer, a past velocity of a wheel revolution;

calculating, by the computer, a virtual velocity from the past velocity; and shifting a bicycle transmission at the virtual velocity calculated by the computer only when the virtual velocity is less than the past velocity.

24. A method of shifting a bicycle transmission comprising the steps of:

providing a plurality of signals indicating successive revolutions of a rotating bicycle component;

calculating, by a computer, a past velocity of the rotating bicycle component;

calculating, by the computer, a virtual velocity of the rotating bicycle component that will occur at a prescribed time after the occurrence of one of the plurality of signals; and shifting a bicycle transmission at the virtual velocity calculated by the computer.

25. The method according to claim 24 wherein the bicycle component is a bicycle wheel.

26. The method according to claim 24 wherein the step of shifting the bicycle transmission comprises the step of shifting the bicycle transmission at the virtual velocity calculated by the computer only when the virtual velocity is less than the past velocity.

27. The method according to claim 26 wherein the bicycle component is a bicycle wheel.

28. A method of shifting a bicycle transmission comprising the steps of:

providing a plurality of signals indicating successive revolutions of a rotating bicycle component;

calculating, by a computer, a past velocity of the rotating bicycle component;

calculating, by the computer, a plurality of past periods of the rotating bicycle component;

calculating, by the computer, a virtual velocity of the rotating bicycle component from the past velocity and the plurality of past periods; and shifting a bicycle transmission at the virtual velocity calculated by the computer.

29. The method according to claim 28 wherein the bicycle component is a bicycle wheel.

30. The method according to claim 28 wherein the step of shifting the bicycle transmission comprises the step of shifting the bicycle transmission at the virtual velocity calculated by the computer only when the virtual velocity is less than the past velocity.

31. The method according to claim 30 wherein the bicycle component is a bicycle wheel.

* * * * *